April 1, 1941.                 A. L. STONE                 2,236,737
APPARATUS FOR APPLYING PLASTIC MATERIAL
Filed Nov. 27, 1937                    2 Sheets—Sheet 1
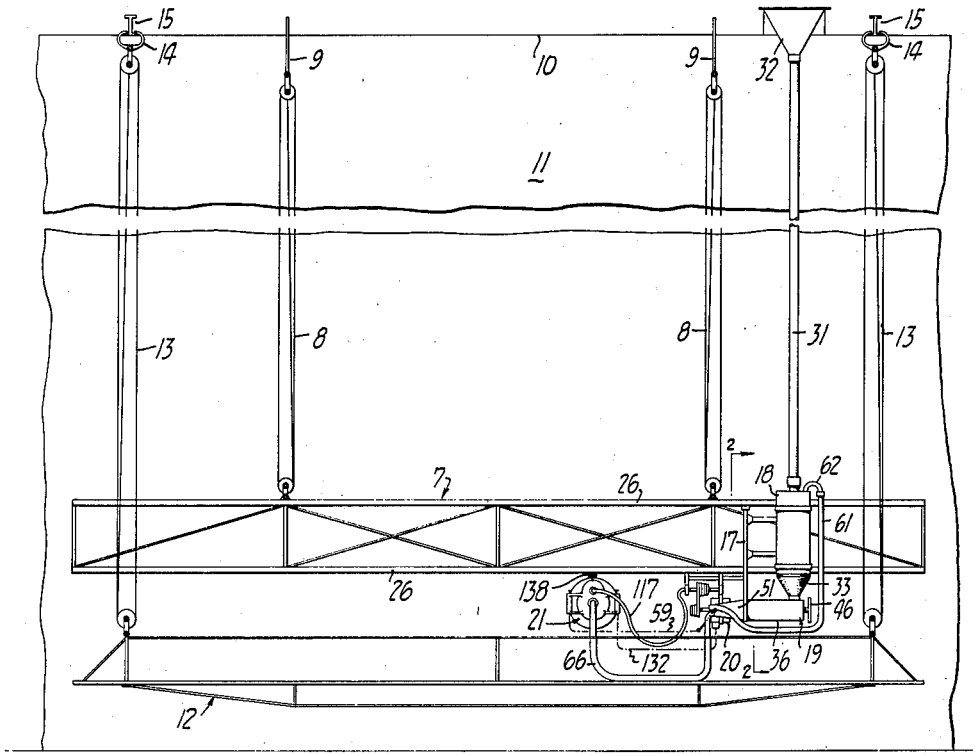
FIG_1_
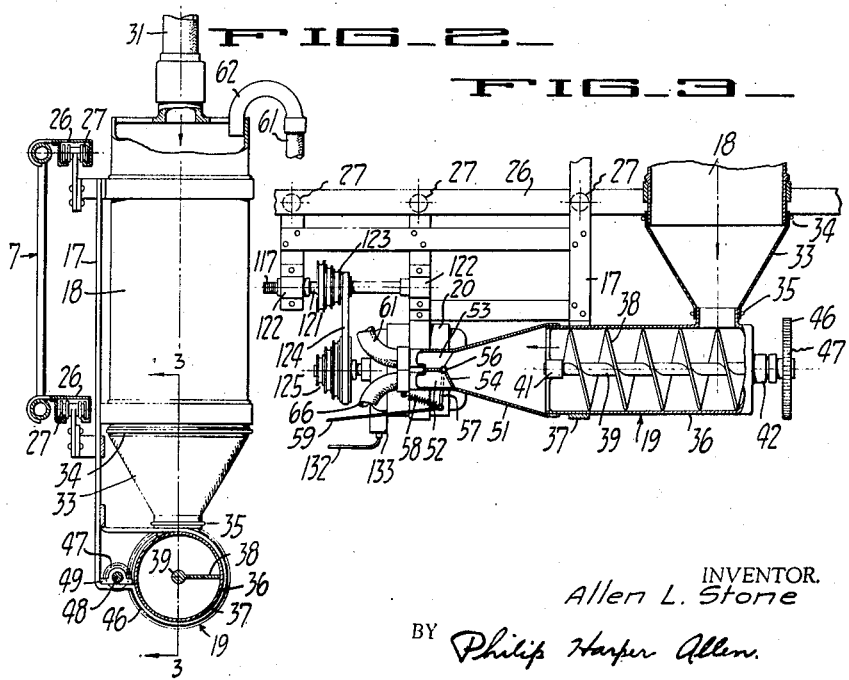
FIG_2_     FIG_3_
INVENTOR.
Allen L. Stone
BY Philip Harper Allen.
ATTORNEY.

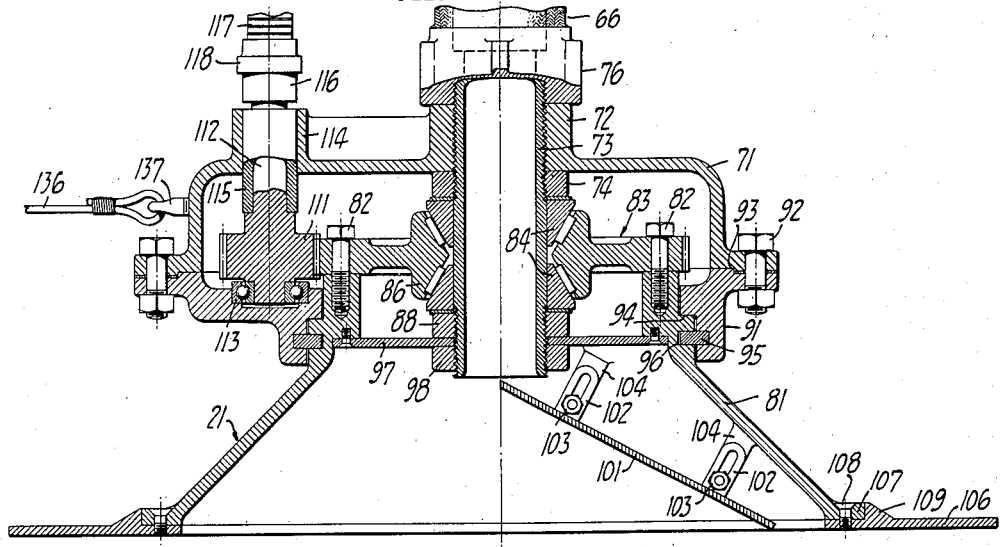
FIG_4_
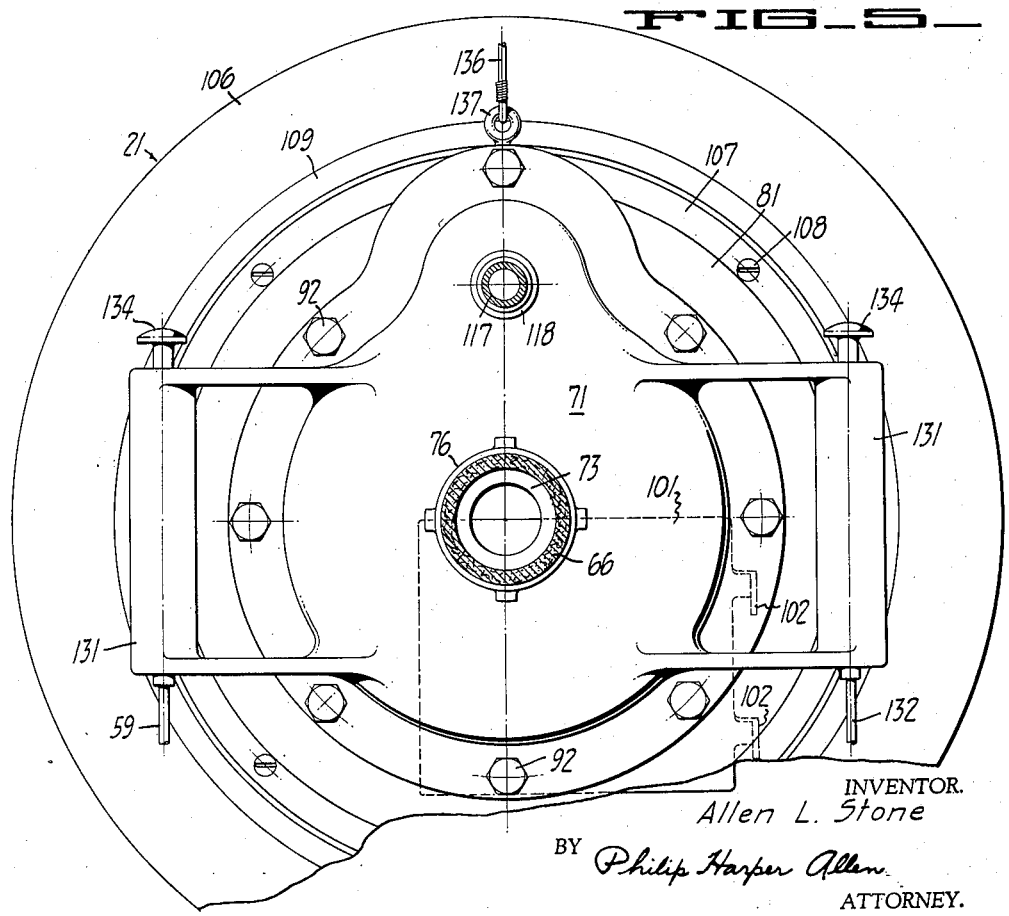
FIG_5_
INVENTOR.
Allen L. Stone
BY Philip Harper Allen
ATTORNEY.

Patented Apr. 1, 1941

2,236,737

UNITED STATES PATENT OFFICE 2,236,737

APPARATUS FOR APPLYING PLASTIC MATERIAL

Allen L. Stone, San Francisco, Calif., assignor, by mesne assignments, to Pneumastic Co., Inc., a corporation of Nevada Application November 27, 1937, Serial No. 176,922

16 Claims. (Cl. 72—130)

My invention relates to apparatus for applying plastic materials of the character used in plastering, surfacing floors, applying monolithic surfaces, and for use generally where plasterers' or finishers' trowels have been used formerly.

The conventional method of applying such materials has involved considerable needless time and labor, principally because the supply of material is carried to the plasterer or other mechanic in wheel barrows, hods, buckets or the like, and is placed on a board as a source of supply and subsequently applied manually by means of a trowel. Also, the plasterer has required the aid of a helper to maintain a supply of and to keep working the plastic material, which as commonly known, will set quickly if not under continuous agitation. The above procedure has required a large number of plasterers, hod carriers and other helpers, which is particularly burdensome in applying lime, gypsum, and cement plaster, and the like to large buildings. In addition, conventional methods of applying plastic materials involve an excessive amount of waste in dropped and discarded material, so that the material cost is unduly high and additional labor is required to clean up after a job is completed. For example, with present practise in plastering walls and other similar surfaces, from fifteen to twenty per cent of the material is wasted, and must subsequently be removed. Moreover, present plastering practise does not obtain uniform blending, particularly where a mixture of two or more colors is used, so that the different scaffold runs are noticeable, as well as the junction between different batches of mixed material.

The method and apparatus for applying plastic materials as disclosed herein is designed to obviate the above noted disadvantageous features by providing for rapid uniform application of plastic materials in a minimium amount of time, with substantially no waste of material, and with a minimum amount of labor required. However, while the amount of labor required to apply plastic material to a surface will be reduced materially, the ultimate effect of the invention will be to increase employment because the field of use of plastic materials will be increased, particularly in applying certain desirable architectural surfaces, such as decorative moldings, monolithic surfaces and the like, which are now too expensive for widespread use.

In addition to the advantages obtained through reduced cost of applying plastic materials, the present invention is further advantageous in providing a more intimate bond between the plastic material and the surface to which it is applied, in providing a finish of improved and uniform appearance, and by enabling a variety of distinctive designs and finishes on the surface which cannot be obtained with hand trowelling.

The present invention has for its general object the provision of apparatus for applying plastic material in a rapid, continuous and efficient manner, while at the same time providing a continuous supply of plastic material which is kept under constant agitation and therefore cannot set and become non-workable.

Another object of the invention is to provide a portable apparatus for applying plastic material which can be readily assembled in place on a job and which can be used to apply a relatively large amount of plastic material in a minimum amount of time.

Another object of the invention is to provide a tool for applying plastic material which will obtain and enable results not possible with the conventional method of manual application.

Another object of the invention is to eliminate unnecessary labor in applying plastic materials, and which will increase the field of useful application of such materials.

Another object of the invention is to provide apparatus for applying plastic material in which the material is supplied by power to an applying tool therefor.

Another object of the invention is to provide an apparatus for applying plastic material in which the material is handled and applied entirely by power.

Another object of the invention is to provide apparatus for handling plastic material wherein the mechanic can obtain a continuous supply of material at a selected desired rate.

Another object of the invention is to provide plastic material applying apparatus having a take-off to supply desired amounts of material for manual application.

Other objects of the invention will be apparent from the following description of a preferred embodiment thereof taken in connection with the accompanying drawings, in which:

Fig. 1 is an elevational view of the apparatus as assembled in place for applying a plastic material to the wall of a building.

Fig. 2 is a sectional elevational of the material supply tank and the feed mechanism illustrating a desired method of mounting on the supporting frame therefor. The view is taken as indicated by the line 2—2 in Fig. 1.

Fig. 3 is a sectional view, with certain parts shown in elevation, the view being taken in the plane of the line 3—3 in Fig. 2 and illustrating the drive and feed mechanisms of the apparatus.

Fig. 4 is a sectional view of the tool for applying the plastic material, the section being taken in the plane extending through the axis of the tool.

Fig. 5 is a rear elevational view of the material applying tool.

The apparatus of my invention is illustrated as embodied in a form for use in applying a plastic material to the wall of a building. Generally, the apparatus includes a supporting frame which can be suspended adjacent the surface to be finished and which carries the working parts of the apparatus including a supply tank, a feed mechanism and a material applying tool, together with a source of power for operating the feed mechanism and the tool. Referring to Fig. 1, the carrier frame 7 is shown supported by pulley mechanisms 8 and hooks 9 from a ledge 10 of building wall 11. Below the frame 7, platform 12 is supported by pulley mechanisms 13 and grappling hooks 14 from outriggers 15 on the building. As described in detail hereinafter, the frame 7 supports the various parts of the apparatus for movement therealong as the work progresses by means of auxiliary frame 17 on which supply tank 18, feed mechanism 19 and electric motor 20 are mounted to supply material in a manner later described, to a tool 21 which is also supported from the frame 7 in a manner later described. Preferably, the frame 7 is adjusted to a convenient height above the platform 12 and then has its fall lines and pulley mechanisms interconnected with those of the platform so as to be raised and lowered as a unit therewith.

As shown in Figs. 1 and 2, the frame 7 is preferably of tubular construction and is provided with vertically spaced tracks 26 extending the entire length thereof to receive roller hangers 27 from which the frame work 17 is suspended. Thus, the supply tank, feed mechanism and the drive mechanism can be easily moved along the frame 7 as desired in applying the material.

As shown in Fig. 1, the supply tank 18 may receive the plastic material by gravity feed thru a flexible hose 31 to which the material is fed from a hopper 32 suitably supported on the building, the hose 31 preferably being of a length to accommodate the movement of the apparatus along the frame 7. The plastic material may be supplied to the hopper 32 in any suitable fashion so that the tank 18 will always have a supply of material during the working hours.

Means are provided for feeding material from the tank 18 to the tool by power, such means also providing for constant agitation of the material by circulation of the material thru the tank if desired when the tool is not in use. Tank 18 has its bottom formed by a conical tube 33 which is preferably formed of canvas or similar flexible material, and which is clamped at its upper end by clamp 34 to tank 18, and at its lower end by clamp 35 to the feed tube 36, which may be releasably supported on auxiliary frame 17 as by clamp 37. It will be noted the flexible character of conical tube 33 and its readily detachable connections to tank 18 and feed tube 36, not only enables easy removal thereof for cleaning and repair, but also enables the workman to apply pressure to and manipulate the plastic material therein in the event of stoppage or clogging of the material.

Within feed tube 36 a feed worm 38 is mounted having its shaft 39 journaled at one end in boss 41 of tube 36 and at its other end in boss 42 thereof, suitable means being provided to take up end thrust on shaft 39. Feed worm shaft 39 is driven by gear 46 secured on the projecting end thereof and meshing with drive pinion 47 (Fig. 2) on motor shaft 48 which is provided with bearing 49 on auxiliary frame 17.

Thus, material flowing by gravity from tank 18 into feed tube 36 will be fed by worm 38 in the direction of the arrow in Fig. 3 into conical discharge tube 51 from which it may be delivered in varying amounts to the applying tool or returned to the tank as may be desired. For this purpose the tube 51 is provided with a pair of adjacent discharge outlets 52 and 53 which may be selectively opened or closed by butterfly valve 54 pivotally supported at 56 in tube 51. The position of valve 54 may be controlled as by lever 57 connected thereto and urged by spring 58 to the position shown in Fig. 3. Lever 57 has flexible cable 59 secured thereto and extending to the tool in a manner later described to enable the operator to adjust the flow of material into either or both of the outlets 52 and 53. By-pass outlet 53 has flexible hose 61 connected thereto, to by-pass the material back to the upper end of the tank, and for this purpose is provided with hook-shaped discharge pipe 62 (Figs. 1 and 2) which may be positioned as shown to return material into the open upper end of the supply tank to provide for circulation of the material. It is considered preferable to so limit the movement of valve 54 so that the by-pass outlet is never completely closed so that no material can become set in and clog by-pass hose 61. Hose 61 and pipe 62 may be used also as desired to supply material for application with hand trowel or other tool in working in corners, patching or the like. The discharge opening 52 has hose 66 releasably secured thereto and leading to the material applying tool which will now be described.

Generally, the material applying tool of my invention comprises a casing and a power driven rotor which is supported on the casing, being journaled about the supply conduit extending through the casing to conduct material to the rotor, so that a simple and practical construction is provided to enable a continuous supply of material to the rotor. As shown in Figs. 4 and 5, gear casing 71 is provided with a central boss 72 which is threaded to receive supply conduit or tube 73 which is locked in place therein by nut 74, coupling 76 being threaded on the outer end of the tube to secure hose 66 in place to supply material thru the tube 73.

Tube 73 provides means for journalling the rotary material applying tool in the casing so that the tool is mounted for rotation relative to the delivery end of the tube. The tool comprises bell-shaped rotor 81 which is secured by cap screws 82 on gear 83 which is journalled about tube 73 by bevel-type roller bearings 84 cooperating with outer race ways 86, formed integrally in the hub of gear 83. The bearings 84 are held in place on tube 73 between nuts 74 and 88 threaded thereon, suitable washers being interposed. Thus the rotor 81 of the tool is journalled for rotation about the supply tube which forms a hollow hub thru which material is forced into the tool for application to the working surface, the journalling of the rotor providing against both end and side thrust to eliminate the possibility of vibration of the tool when in use.

In order to provide a seal between the casing 71 and the rotor 81, a cover 91 is secured on casing 71 by bolts 92, interlocking flanges 93 being provided to insure accurate positioning of the cover. Cover 91 has annular shoulder 94 for receiving a corresponding shoulder of rotor 81, the seal being completed by sealing ring 95 suitably secured in an annular groove in cover 91 and extending into a corresponding groove 96 of the rotor 81. The grease chamber formed within casing 71 is preferably sealed off from the material chamber in rotor 81, and for this purpose rotor 81 carries a packing gland 97 suitably secured thereto and extending inwardly into the sealing relation between nut 88 and a nut 98 threaded on the inner end of the tube 73.

The material applying tool includes a rotary trowel for mixing and spreading the material against the working surface and a smoothing and cutting blade for establishing the plane of operation of the trowel. The rotary trowel comprises a spirally mounted blade 101 having its inner end partially overlapping the delivery opening of tube 73 and having its outer end terminating adjacent the face of the rotor; the blade 101 being mounted by L-shaped slotted brackets 102 which are adjustably secured by fastening bolts 103 in engagement with pads 104 of rotor 81. In this manner, the blade 101 can be adjusted inwardly and outwardly with respect to the rotor to gauge the thickness of material being spread at the outer end of the trowel. In order to establish the position of the tool relative to a working surface as well as to smooth and plane the working surface, the rotor 81 is provided with a smoothing and cutting blade 106 which is secured around outer flange 107 of the rotor 81 as by screws 108, with annular reinforcing rib 109 of the blade in engagement with the outer face of flange 107.

To provide the drive for the rotor, gear 83 (Fig. 4) meshes with drive pinion 111 having its shaft 112 journalled in cover 91 by bearing 113 and in boss 114 of case 71 by bushing 115. The projecting end of shaft 112 carries chuck 116 to receive a conventional flexible drive shaft assembly 117 by means of a threaded coupling 118. Flexible drive shaft assembly 117 (Figs. 1 and 3) is secured at its other end to jack shaft 121 mounted by bearings 122 on auxiliary frame 17 and carrying a pulley mechanism 123 which may be driven at selected speed ratios thru belt 124 from a similar pulley mechanism 125 on motor shaft 48. Preferably, the speed ratio is such as to provide a speed of the rotor from 60 to 400 R. P. M.

In order to guide and control the tool the casing 71 (Fig. 5) is provided with opposite handles 131 to be grasped by the mechanic, the respective handles being apertured to receive flexible cable 59 for controlling the flow of material by adjusting the valve 54, and flexible cable 132 which extends to a magnetic switch 133 (Fig. 3) controlling the operation of the motor. Both cables 59 and 132 terminate in buttons 134 which may be conveniently manipulated by the mechanic while grasping the handles 131.

Preferably, the tool is suspended by counter balancing means so that the weight thereof need not be supported by the mechanic and such counter balancing means may comprise a cable 136 (Figs. 4 and 5) secured in an eye 137 on casing 71 and extending upwardly to a conventional form of spring-urged reel mechanism 138 (Fig. 1) which is supported by suitable roller hangers running in lower track 26 so that the tool can be moved about readily. Preferably, the tension on the cable 136 is such that the tool will be counter balanced when loaded with material, so that the mechanic can readily manipulate the tool throughout the working day without becoming fatigued from supporting the weight of the tool and the material therein.

In operation, plaster (or other plastic material) is supplied to the hopper 32 in any convenient manner as required, and descends thru flexible hose 31 into the tank 18 from which it flows into the feed tube 36 (Fig. 3) into engagement with the worm 38. It will be noted that the constant withdrawal of the material from the tank by the worm 38 will cause the material in the tank 18 to shift about and be agitated so that it will not set.

From the worm 38 the plastic material is forced into either or both of the discharge outlets 52 and 53 as selected by the operator in adjusting valve 54. If no material is desired for use in the tool, the valve is adjusted to its normal position shown in Fig. 3 so that a circulation of the material occurs from the tank thru the feed tube 36 into the by-pass hose 61 and back into the tank. If material is desired for application to a surface and the full flow is desired, the valve is adjusted to almost close the discharge outlet 53 so that the material is forced thru the flexible hose 66, from whence it is discharged thru the tube 73 into the rotor 81. The operator by grasping the handles of the tool places the planing blade 106 against the working surface and moves the tool about over the working surface, preferably in a rotary path so that the planing blade 106 will serve to first smooth and condition the working surface for applying the material, and then together with the trowel blade 101 apply and force the material onto the working surface. As the material is delivered from the tube 73, it is cut and moved about with the rotor by the trowel blade 101 so that the material within the blade is under constant movement, the blade 101 acting as a trowel to force the plaster onto the working surface. Particular attention is directed to the continuous flow of material made possible by the mounting of the material working blades about the conduit for supplying material thereto, so that material can be applied and worked continuously over a large surface.

The rotary power driven action of the tool is such as to produce a very intimate bond between a working surface and the applied material, which may be spread at any desired thickness by proper manipulation of the tool. It is possible to apply a much thinner coat of material and secure better bonding by the combined action of the rotary trowel 101 and the planing and smoothing blade 106 than can be obtained with a hand trowel, and a much smoother and more desirable finish is obtained. This is particularly true where variegated colors are used to obtain a desired effect as the continuous supply of the material and the thorough mixing and blending action of the tool insure a uniform effect on the finished surface.

It will be understood that the tool can be used with all varieties of plastic material, such as lime, gypsum, cement plaster, for exterior surfaces, and the usual plaster for interior surfaces, concrete, cement, monolithic plaster and the like, for surfacing and placing monolithic floor slabs, concrete roadways, sidewalks, and floors, as well as for spreading and surfacing composition floor coverings, such as magnesite and compolite. For different types and textures of material and to obtain different types and designs of surfaces, varying form of blades 101 and 106 may be used. Also, if desired, the tool can be used merely as a smoothing and finishing tool, in which event no material need be supplied to the tool and the blade 106 may be of a character to perform the desired refinishing of the surface. Also, the tool can be used for cleaning structural surfaces, in which event the cleaning fluid could be supplied and applied to the surface at the same time that the surface is being planed by the blade 106.

It will be noted also that by disconnecting the flexible shaft 117 any suitable form of power driven tool may be used in finishing operations as for example, in finishing corners, cutting moldings, and architectural designs in plastic surfaces, for which small amounts of material may be obtained if desirable from the by-pass hose 61.

While I have shown and described a preferred embodiment of the invention it will be understood that the invention can be employed in other forms and is capable of both variation and modification from the embodiment selected for illustration herein. The scope of the invention therefore should be limited only by the proper interpretation and true scope of the appended claims.

I, therefore, claim as my invention:

1. Apparatus for applying plastic material to a working surface; comprising a track; a material supplying unit mounted for movement along said track including a material tank, feed mechanism for withdrawing material from said tank, and a source of power for driving said feed mechanism; a manipulable material applying tool, comprising a casing, a material supplying conduit extending through a wall of said casing, and a material applying rotor journalled for rotation about said conduit to receive material therefrom; a flexible hose extending from said feed mechanism to said conduit; and flexible drive means extending from said source of power to said rotor.

2. Apparatus for applying plastic material to a working surface; comprising a track; a material supplying unit mounted for movement along said track including a material tank, feed mechanism for withdrawing material from said tank, and a source of power for driving said feed mechanism; a manipulable material applying tool, comprising a casing, a material supplying conduit extending through a wall of said casing, and a material applying rotor journalled for rotation about said conduit to receive material therefrom; a flexible hose extending from said feed mechanism to said conduit; flexible drive means extending from said source of power to said rotor; and control means for both said feed mechanism and said source of power including manipulable means mounted on said casing.

3. Apparatus for applying plastic material to a working surface; comprising a track; a material supplying unit mounted for movement along said track including a material tank, feed mechanism for withdrawing material from said tank, and a source of power for driving said feed mechanism; a manipulable material applying tool, comprising a casing, a material supplying conduit extending through a wall of said casing, and a material applying rotor journalled for rotation about said conduit to receive material therefrom; a flexible hose extending from said feed mechanism to said conduit; flexible drive means extending from said source of power to said rotor; and extensible counter balancing means supporting said tool and mounted for movement along said track.

4. Apparatus for applying plastic materials to a working surface, comprising a frame having a track thereon, an auxiliary frame supported on said track, a supply tank on said auxiliary frame, feed mechanism on said auxiliary frame to receive material from said tank, a source of power on said auxiliary frame having a drive connection to said feed mechanism, a power driven tool for applying plastic material to a surface, a flexible conduit extending from said feed mechanism to said tool, and a flexible drive connection from said source of power to said tool.

5. Apparatus for applying plastic materials to a working surface, comprising a frame having a track thereon, an auxiliary frame supported on said track, a supply tank on said auxiliary frame, feed mechanism on said auxiliary frame to receive material from said tank, a source of power on said auxiliary frame having a drive connection to said feed mechanism, a tool for applying plastic material to a working surface; a flexible conduit extending from said feed mechanism to said tool, and a by-pass conduit extending from said feed mechanism to said tank.

6. Apparatus for applying plastic material to a working surface comprising a tool for applying material to a surface, a material feeding mechanism, a flexible conduit extending from said feeding mechanism to said tool, and means for selectively controlling said feeding mechanism to circulate material therein or to feed material through said conduit to said tool.

7. A tool for applying plastic material to a working surface, comprising a casing, a conduit extending through said casing, a gear journalled for rotation about said conduit, a recessed rotor mounted on said gear coaxially therewith with the discharge end of said conduit opening therein, sealing means between said rotor and said casing and between said rotor and said conduit, a drive shaft journalled in said casing, and a pinion on said drive shaft meshing with said gear.

8. A tool for applying plastic material to a working surface, comprising a casing, a material supplying conduit extending through a wall of said casing, and a material applying rotor journalled for rotation about said conduit and receiving material therefrom.

9. A tool for applying plastic material to a working surface, comprising a casing, a material supplying conduit extending through a wall of said casing, and a material applying rotor journalled for rotation about said conduit to receive material therefrom, said rotor comprising an annular surface-engaging planing blade and a mixing and spreading blade having an edge overlapping the discharge end of said conduit.

10. A tool for applying plastic material to a working surface, comprising a casing, a material supplying conduit extending through a wall of said casing, and a material applying rotor journalled for rotation about said conduit to receive material therefrom, said rotor comprising an annular surface-engaging planing blade, a mixing and spreading blade having an edge overlapping the discharge end of said conduit, and another edge adjacent the plane of said planing blade, and means mounting said mixing and spreading blade within said rotor for adjustment relative thereto to vary the distance from said another edge relative to said plane of said planing blade.

11. A tool for applying plastic material to a working surface comprising a recessed rotor constructed to form a material confining chamber with a working surface, a conduit extending through the axis of rotation of said rotor to supply material to said chamber, and a mixing and spreading blade mounted in said rotor in oblique relation to said axis of rotation.

12. A tool for applying plastic material to a working surface comprising a recessed rotor constructed to form a material confining chamber with a working surface, a conduit extending through the axis of rotation of said rotor to supply material to said chamber, and means for forcing material under pressure through said conduit into said chamber.

13. A tool for applying plastic material to a working surface comprising a recessed rotor constructed to form a material confining chamber with a working surface, a conduit extending through the axis of rotation of said rotor to supply material to said chamber, an annular planing blade detachably mounted on said rotor for engagement with a working surface, and a mixing and spreading blade detachably mounted within said rotor for cooperation with material discharged from said conduit.

14. A tool for applying plastic material to a working surface comprising a recessed rotor constructed to form a material confining chamber with a working surface, a conduit extending through the axis of rotation of said rotor to supply material to said chamber, means for establishing the working plane of said rotor, and means carried by said rotor for spreading material confined therein on a working surface.

15. A tool for applying plastic material to a working surface comprising a recessed rotor constructed to form a material confining chamber with a working surface, variable speed drive means for said rotor, a conduit extending through the axis of rotation of said rotor to supply material to said chamber, and mixing and spreading means mounted in said rotor for cooperation with material discharged from said conduit, said variable speed drive means enabling adjustment of the working of said mixing and spreading means in accordance with the character of plastic material being used and the desired character of the finish.

16. A tool for applying plastic material to a working surface comprising a recessed rotor constructed to form a material confining chamber with a working surface, variable speed drive means for said rotor, a conduit extending through the axis of rotation of said rotor to supply material to said chamber, mixing and spreading means mounted in said rotor for cooperation with material discharged from said conduit, and means for controlling the flow of material through said conduit, said variable speed drive means enabling adjustment of the working of said mixing and spreading means in accordance with the character of plastic material being used and the desired character of the finish.

ALLEN L. STONE.